(12) United States Patent
Masuda

(10) Patent No.: US 7,050,399 B2
(45) Date of Patent: May 23, 2006

(54) TRANSPORT NETWORK WITH CIRCUITRY FOR MONITORING PACKET PATH ACCOMMODATED IN STM PATH

(75) Inventor: Michio Masuda, Tokyo (JP)

(73) Assignee: NEC Corporation, Tokyo (JP)

( * ) Notice: Subject to any disclaimer, the term of this patent is extended or adjusted under 35 U.S.C. 154(b) by 638 days.

(21) Appl. No.: 10/177,100

(22) Filed: Jun. 24, 2002

(65) Prior Publication Data

US 2002/0196784 A1 Dec. 26, 2002

(30) Foreign Application Priority Data

Jun. 25, 2001 (JP) ............................. 2001-191865

(51) Int. Cl.
*G01R 31/08* (2006.01)
*H04J 3/02* (2006.01)

(52) U.S. Cl. ...................................... 370/245; 370/538
(58) Field of Classification Search ...................... None
See application file for complete search history.

(56) References Cited

U.S. PATENT DOCUMENTS 6,134,238 A 10/2000 Noh

| | | | |
|---|---|---|---|
| RE37,401 E * | 10/2001 | Yamashita et al. | 714/717 |
| 6,359,859 B1 * | 3/2002 | Brolin et al. | 370/218 |
| 2002/0075906 A1 * | 6/2002 | Cole et al. | 370/535 |
| 2002/0083190 A1 * | 6/2002 | Kamiya et al. | 709/236 |
| 2002/0191617 A1 * | 12/2002 | Duplessis et al. | 370/400 |

FOREIGN PATENT DOCUMENTS

| JP | 7-46238 | 2/1995 |
|---|---|---|
| JP | 2001-53756 | 2/2001 |
| WO | WO 98/47298 | 10/1998 |

\* cited by examiner

*Primary Examiner*—Duc Ho
(74) *Attorney, Agent, or Firm*—McGinn IP Law Group, PLLC.

(57) ABSTRACT

A network node of a SONET ring is provided with a tributary line interface that receives packets from LAN users. A packet switch performs a switching operation on the LAN packets. An aggregate line interface establishes an STM path on a communication link and a number of packet paths within the STM path. An STM switch connects the packet switch between the tributary line interface and the aggregate line interface so that the switched packets are transported over the packet paths. Monitoring circuitry monitors the LAN packets and produces a warning signal if an abnormal condition is detected in one of the packet paths and transmits the warning signal to the communication link. Preferably, the monitoring circuitry is provided in the tributary line interface.

13 Claims, 11 Drawing Sheets

TRANSPORT NETWORK WITH CIRCUITRY FOR MONITORING PACKET PATH ACCOMMODATED IN STM PATH

BACKGROUND OF THE INVENTION

1. Field of the Invention

The present invention relates to a transport network such as SONET (Synchronous Optical NETwork) ring in which STM (synchronous transport module) traffic and high-speed LAN (local area network) traffic, such as Gigabit Ethernet, are transported in a high capacity STM path.

2. Description of the Related Art

With the proliferation of low-cost, high-speed local area networks (Gigabit Ethernet), the recent tendency of transport technology is toward using the ITU-approved standards for Generic Framing Procedure (GFP) and Virtual Concatenation (VC) for creating Ethernet services within existing high-speed TDM (time division multiplex) backbone networks as represented by the SONET ring. GFP is a framing technique that allows multiple packets of layer-2 protocols to be placed in a frame of common data structure. The GFP framing technique eliminates the flag pattern issue associated with the prior art POS (PPP over SONET) framing technique and allows efficient accommodation of many different packet services by taking advantage of statistical multiplexing capability. On the other hand, virtual concatenation significantly improves the efficiency of data transport by grouping the synchronous payload envelopes of SONET frames in a nonconsecutive manner to create virtual concatenated groups of specific size. This virtual concatenation method allows finer granularity for provisioning of bandwidth services and is an extension of an existing concatenation method (i.e., contiguous concatenation) in which groups are presented in a consecutive manner with coarse granularity. Virtual concatenation allows efficient transport of Gigabit Ethernet. In the prior art, Gigabit Ethernet is transported over SONET networks using the nearest contiguous concatenation group size available, wasting a substantial amount of communication bandwidth. For example, a VC-4 (150 Mbps) channel must be used to transport a 100-Megabit Ethernet wasting approximately 33 percent of the transport bandwidth. Virtual concatenation of two VC-3 (50 Mbps) channels can transport a 100-Megabit Ethernet channel, utilizing 100 percent of the available bandwidth.

However, since the prior art packet network has no robust monitoring system that meets the OAM (operations, administration and maintenance) requirements of a large scale transport network, transport providers are likely to experience difficulty in determining the point of responsibility when a failure occurs in the network.

Although the native SONET network is provided with a number of monitoring systems, they are specifically designed to meet the needs of its different layers (Path, Section and Line) and their coverage does not extend to the edge point of the network where it is connected to a local area network.

If the prior art monitoring system of STM path layer is used in an STM-LAN transport system, a failure on a single packet path layer would be taken as a failure of a bundle of packet path layers and more than one alarm signal is generated, producing a number of unnecessary warning signals. To avoid this problem, one-to-one provisioning must be made so that packet paths are respectively established in STM paths. However, such an arrangement would impose serious limitations on network OAM functions and the inherent advantages of statistical multiplexing capability of packets and the flexible bandwidth allocation of virtual concatenation cannot be fully exploited.

A number of path monitor systems are known. In the path monitor system disclosed in Japanese Patent Publication 2001-53756, an information signal from an input interface port is switched through an n×n switch to an output interface port according to path setup information supplied from a scheduler. The established path is monitored by checking parity bits of the information signal. In order to monitor paths which are not established due to invalid path setup information, a counter is provided at each output interface port for incrementing its count value when the path setup data is determined to be invalid. The incremented count value is transmitted in a packet as path setup data, which is also used at a receive site as a path supervisory signal.

Japanese Patent Publication 1995-46238 discloses a monitoring system for a packet routing network. In this system, path inspection packets are inserted into the routing network and routed through different paths. When each packet passes through a strategic point of the network, it is given information identifying the passing point. The inspection packets are then removed from the network and their passing point information is checked against known scheduling information. If no coincidence is detected, it is determined that there is an abnormal condition in the routing network and a warning signal is generated.

A paper entitled "GFP Breakout group report and GFP Revision 1", Enrique Hernandez-Valencia, prepared by Lucent Technologies Inc. as a Contribution to T1 Standards Project (Digital Optical Hierarchy) describes an OAM aspect of the GFP control frame format. However, the transport mechanism of the GFP frame is still at open issue.

SUMMARY OF THE INVENTION

It is therefore an object of the present invention to provide a transport network and a network node which are capable of monitoring multiple packet paths established within an STM path with the ability to assist transport providers to identify the maintenance boundary point when a failure occurs in the network.

Another object of the present invention is to provide a network node which are capable of monitoring a plurality of packet paths established within an STM path and which impose no limitations on network OAM functions while meeting the needs of a large scale backbone network.

According to a first aspect of the present invention, there is provided a transport network comprising a plurality of network nodes, each of the nodes receiving STM frames and LAN packets. Each of the network nodes establishes an STM path on a communication link for transporting the STM frames and assigning a plurality of packet paths within the STM path for transporting the LAN packets on the packet path, and each of the network nodes monitors the packets, produces a warning signal if an abnormal condition is detected in one of the packet paths and transmits the warning signal to the communication link.

According to a second aspect, the present invention provides network node comprising a tributary line interface for receiving LAN packets, a packet switch for performing a switching operation on the LAN packets, an aggregate line interface for establishing an STM path on a communication link and establishing a plurality of packet paths within the STM path, an STM switch for connecting the packet switch between the tributary line interface and the aggregate line interface so that the switched packets are transported over the packet paths, and monitoring circuitry for monitoring the packets, producing a warning signal if an abnormal condition is detected in one of the packet paths and transmitting the warning signal to the communication link.

BRIEF DESCRIPTION OF THE DRAWINGS

The present invention will be described in detail further with reference to the following drawings, in which.

DETAILED DESCRIPTION

Figure 1:
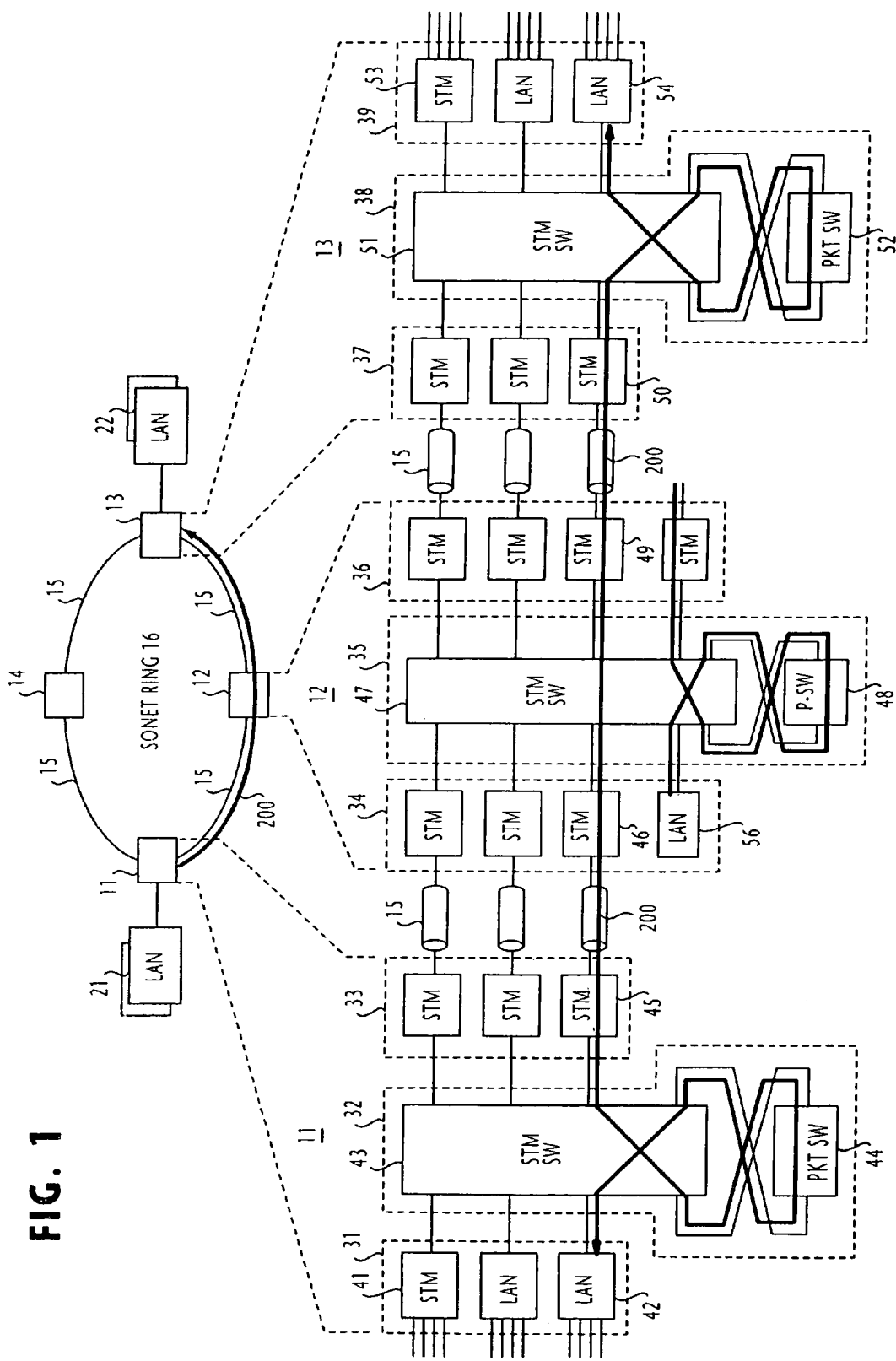
FIG. 1 is a block diagram of an optical ring network with an illustration of details of ingress, transit and egress nodes which form a section of the ring.

Referring to FIG. 1, there is shown an optical transport network according to the present invention. The network is comprised of a plurality of nodes (network elements) 11, 12, 13, 14 which are interconnected by optical links 15 to form a SONET ring 16. Local area networks 21 and 22 are connected to edge nodes 11 and 13, respectively.

The network nodes are STM-MAC (synchronous transport module-MAC layer) network elements of similar configuration.

As described in detail below, the optical network has packet transport facilities that enable local area networks to increase their traffic which has hitherto been transported by a SDH/SONET backbone network. In order to increase the utilization efficiency of existing STM facilities, point-to-point communication is implemented by sharing a plurality of packet paths with a single STM path. Specifically, the LAN-attached nodes, or edge nodes 11 and 13 include LAN interface to serve Gigabit-Ethernet traffic, in addition to STM interface. A plurality of logical paths, called packet paths 200, are assigned to one of a plurality of STM paths established between neighboring nodes. Each of the network nodes along the paths 200 is provided with a fault monitory facility, which monitors the packet paths 200 and transmits a warning message to the link 15 when an abnormal condition is detected. The warning message is repeated along the route until the message arrives on a predetermined destination node.

More specifically, the edge node 11 includes a switching unit 32, a tributary line interface unit 31 connected to user-side ports of switching unit 32, and an aggregate line (or trunk) interface unit 33 connected to network-side ports of switching unit 32. Tributary line interface unit 31 includes an STM line card 41 for receiving STM traffic of LAN 21 and a plurality of GBE-(Gigabit-Ether) LAN line cards 42 for receiving packet traffic of LAN 21. Aggregate line interface unit 33 has a plurality of existing STM line cards 45. The switching unit 32 is comprised of a synchronous STM switch card 43 and an asynchronous packet switch card 44 connected between a user-side port and a network-side port of the STM switch card 43. STM line card 41 and LAN line cards 42 are connected to user-side ports of the STM switch card 43 and the STM line cards 45 are connected to the network-side of STM switch card 43. STM switch card 43 is a synchronous time switch which enables STM paths to be established between its user-side ports and network-side ports and enables packet paths to be established between LAN line cards 42 and STM line cards 45 via the packet switch card 44. Packet switch card 44 determines the transmit timing of a packet received from LAN line cards 42 so that the packet is switched through the STM switch card 43 to a desired STM line card 45. An originating section of a packet path 200 is established in this way.

Node 12, which is a transit node, includes aggregate line interface units 34 and 36 and a switching unit 35 connected therebetween. Each of the aggregate line interface units 34 (36) has a plurality of existing STM line cards 46 (49). STM line cards 46 are connected by links 15 to corresponding STM line cards 45 of node 11. Similar to node 11, the switching unit 35 of node 12 is comprised of a synchronous STM switch card 47 and an asynchronous packet switch card 48. STM switch card 47 is connected between STM line cards 46 and STM line cards 49. An intermediate section of packet paths 200 may be established singly by the STM switch 47, or jointly by the STM switch card 47 and packet switch card 48. If a LAN line card 56 is provided, another packet path may be established through the packet switch 48.

Edge node 13 includes a switching unit 38, an aggregate line interface unit 37 connected to the network-side ports of switching unit 38, and a tributary line interface unit 39 connected to the user-side ports of switching unit 38. Aggregate line interface unit 37 has a plurality of STM line cards 50, and the tributary line interface 39 has an STM line card 53 and a plurality of GBE-LAN line cards 54. Switching unit 38 is comprised of a synchronous STM switch card 51 and an asynchronous packet switch card 52. Packet switch card 52 is connected to between a user-side port and a network-side port of STM switch card 51. STM line cards 50 are connected to the network-side ports of STM switch card 51, and the STM line card 53 and LAN line cards 54 are connected to the user-side ports of STM switch card 51. STM switch card 51 establishes STM paths between the STM line cards 50 and the STM line card 53 and establishes packet paths between the STM line cards 50 and LAN line cards 54 via the packet switch 52. Packet switch card 52 receives packet traffic from an STM line card 50 through STM switch card 51 and determines one of its user-side ports as a termination point of a packet path 200.

Figure 2:
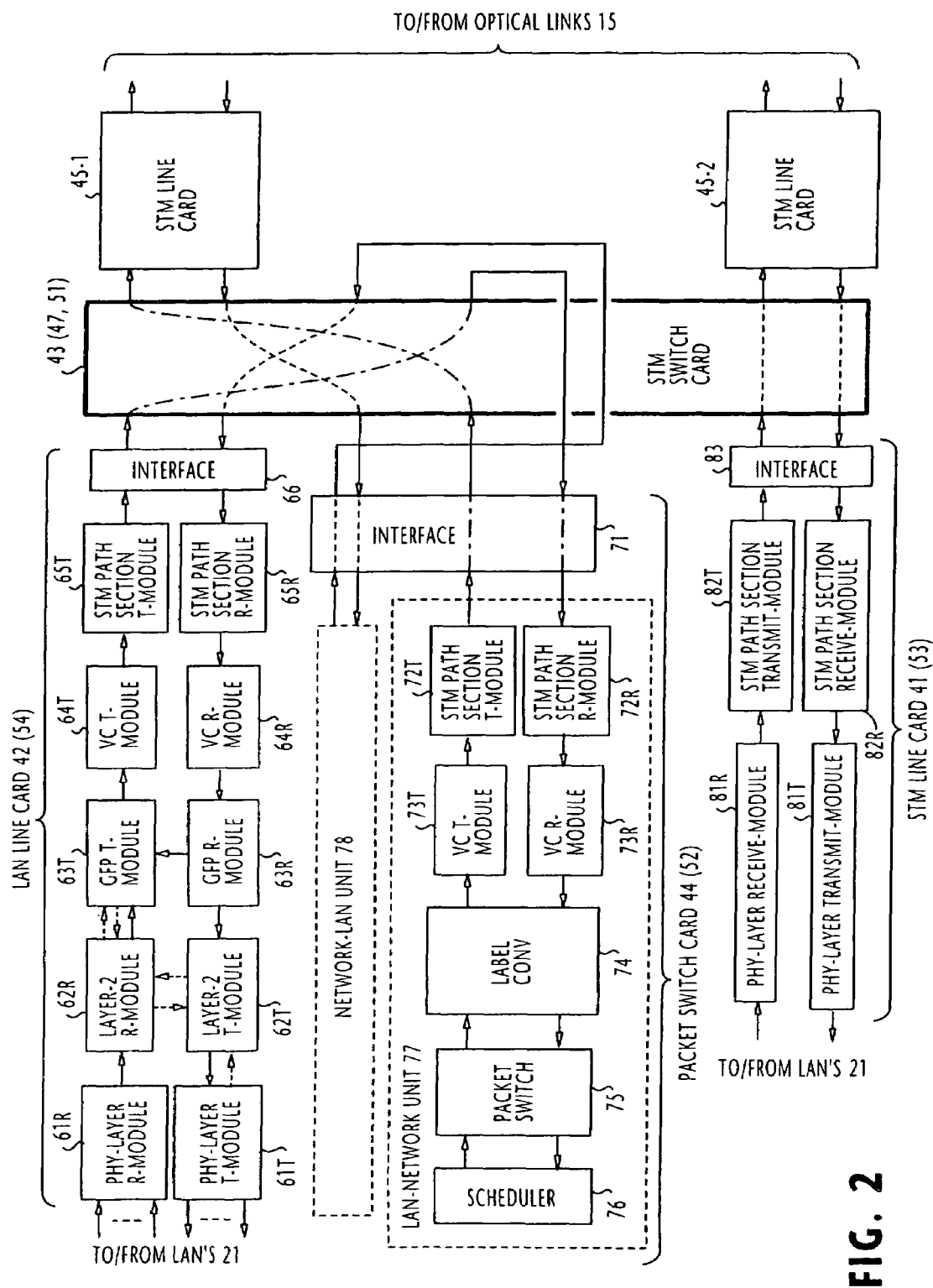
FIG. 2 is a block diagram of a network node of the present invention.

Details of the LAN line cards 42 and 54 are shown in FIG. 2.

In FIG. 2, a physical layer receive module 61R is a physical layer termination point which receives an optical LAN packet from the associated LAN user and converts it to an electrical 10-bit wide parallel signal. The header of the packet contains information as to the positions of the header and tail bytes, the label, the destination of the packet and an MCR supervisory tag.

A layer-2 (MAC layer) receive module 62R is connected to the output of physical-layer receive module 61R. Layer-2 receive module 62R is a layer-2 initiation element which deletes the preamble and SFD field from the packet and performs a CRC test and converts the packet to a 10B/8B code, producing layer-2 packet data. In addition, it includes a path monitor circuit that monitors the output level of physical-layer transmit-module 61T and produces a warning signal when no LAN packets are received from the associated LAN.

A GFP (Generic Framing Procedure) transmit module 63T is a GFP initiation element which receives the layer-2 packet data and the warning signal from the layer-2 transmit module 62T and encapsulates the packet data in a GFP frame so that the layer-2 protocol are mapped to the SONET protocol. In order to indicate the destination of the GFP frame, the GFP transmit module 63T formulates a core header (PLI, cHEC) of the GFP frame and places a GFP label in the core header, assigns a label corresponding to a physical source port, a tag and a destination port number, formulates a payload header (type, tHEC, label, tag, eHEC) of the GFP frame and performs a policing process to determine the remarks of the tag (or discard), produces a frame check sequence (CRC-32). The policing process further determines the priority of LAN packets based on the label. As an alarm transfer function of each packet path 200, the GFP transmit module 63T has the ability to formulate a packet-path alarm indication signal (AIS) and the ability to detect the packet path AIS signal and produce a packet-path remote defect indication (RDI) signal. After scrambling the payload of the GFP frame, the GFT transmit module 63T forwards the frame to a VC (virtual concatenation) transmit module 64T.

VC transmit module 64T is a VC initiation element which maps the GFP frame to the payload field of an STM frame and performs virtual concatenation on the mapped data so that the packet traffic is efficiently multiplexed with the STM traffic. VC transmit module 64T includes a function for creating a POH (path overhead) field for the STM frame. To perform the virtual concatenation process for grouping payload data in a nonconsecutive manner, the VC transmit module 64T further includes a function for producing information of the payload's sequence indicator and a multiframe indicator (MFI) for alignment of a virtual concatenated group.

The output of VC transmit module 64T is used by an STM path section transmit module 65T. STM path section transmit modulate 65T is an STM path section initiation element which generates field values of the POH and SOH (section overhead) fields of an STM frame and performs BIBP calculation and insertion of P-RDI and P-REI and assembles an STM frame (including pointer) and provides STM path monitoring by inserting an inter-card path supervision byte B1 in the section overhead. The output of STM path section transmit module 65T is passed through an interface 66 to the STM switch card 43.

In accordance with the STM path in which the user's packet path is accommodated, the STM frame from the LAN line card 42 is routed through the STM switch card 43 to the packet switch card 44.

Packet switch card 44 is comprised of an interface 72 and a pair of a LAN-network unit 77 and a network-LAN unit 78 of identical construction. Therefore, it will suffice to discuss a representative unit, for example, the LAN-network unit 77, with the understanding that the discussion applies to the network-LAN unit 78 as well.

The STM frame from the LAN line card 42 is passed through the interface 71 to an STM path section receive module 72R (or STM path section termination element), which operates as a termination point of an STM Section as well as a termination point of an STM Path (STM path pointing process) and examines the B1 byte of the Section overhead to monitor the STM path. Further, the STM path section receive module 72R extracts an MFI signal from the frame, which will be used for a subsequent virtual concatenation process. In addition, it absorbs phase differences between the virtually concatenated channels of the STM frame.

The output of STM path section receive module 72R is applied to a VC receive module 73R. VC receive module 73R is a VC termination element which extracts a layer-2 frame from the STM frame corresponding to an appropriate virtually-concatenated channel and detects a GFP frame mapped in the payload field of the STM frame through a de-mapping process. Further, the VC receive module 73R performs a 1-bit error detection and correction process on the detected GFP frame by calculating the HEC of the core header and discards the layer-2 frame depending on the error calculation. Additionally, it multiplexes packets on a channel-by-channel basis, performs padding and produces an output signal of data format in which packets are multiplexed on individual channels.

Upon receipt of a GFP frame from the VC receive module 73R, a label converter 74 descrambles its payload data and supplies the descrambled payload data to a packet switch 75.

Packet switch 75 is an asynchronous time switch that provides statistical multiplexing of LAN packets. Packet switch 75 includes a payload memory in which it stores the descrambled payload data. The packet data stored in the payload memory are managed on a per 4-word (32 bytes) basis by a link list. Packet switch 75 formulates a "request" signal with a destination channel indication, label, length data and so forth and sends it to a packet scheduler 76 and receives a "grant" signal from the packet scheduler 76 on a per channel basis to perform packet switching (channelized: VC4/VC4-4c/VC4-16 and virtual concatenation: VC4-Nv) according to an instruction from the packet scheduler 76. As described above, the incoming signal from the LAN is organized in packets of length that is an integer of 8 bytes and contains information indicating the header byte of each packet, the tail byte of the packet a label, the destination of the packet, a MCR monitoring tag, in addition to payload data, The outgoing signal from the network to the LAN is word-interleaved for respective channels and contains the destination of a packet, the header byte of the packet, the tail byte of the packet in addition to payload data.

Packet switch 75 has an internal read control memory with a capacity of 48 entries for channel information. The channel information stored in the read control memory are read out corresponding to the number of output channels of a VC transmit module 73T in order to read the payload data from the payload memory on a per 8-byte basis. On a per channel basis, the packet switch provides controlling of the number of idle addresses in the payload memory and discards a packet if not sufficient number of idle addresses is available. When a grant signal is received, the packet switch 75 returns a backpressure signal to the packet scheduler 76. Packet switch 75 receives a backpressure signal from the VC transmit module 73T to stop the reading of channel data from the payload memory. As a packet-path monitoring function, the packet switch provides parity insertion and monitoring on data that is transferred through an interface to discard corrupted packets.

Packet scheduler 76 performs absolute priority scheduling. In response to the request signal from the packet switch 75 for a number of accommodated channels, the packet scheduler 76 determines the sequential order of packets to be read out of the payload memory of the packet switch according to the priority determined by the policing operation which was previously performed by the GFP transmit module 63T. More specifically, the packet scheduler 76 places the requests (REQ/GNT-INH) from the packet switch in a queue according to channel destination and high and low priority levels and manages the packet sequence on a per label basis. Channel bandwidth is also taken into account when determining the number of packets to be read from the payload memory. The output of the scheduler 76 thus represents path-setup information for establishing a packet path within an STM path.

Packet data from the packet switch 75 are supplied to the label converter 74. In response, the label converter 74 performs scrambling on the payload field of each packet and performs an error detection/correction process on the headers tHEC/eHEC (i.e., type Header Error Check/extended Header Error Check), discards the packet if an error is uncorrectable, performs an FCS (frame check sequence) calculation on a per L2-label basis. Based on the FCS error check, the label converter 74 determines whether an abnormal condition is detected in a packet path 200. Label converter 74 includes a conversion memory in which destinations are mapped to labels during system startup or whenever labels are modified during system operation. Label converter 74 references the label contained in the received packet and makes a search through the memory for detecting a transmit label and an output channel number and replaces the received label with the detected label. If the label contained in the received packet is one that is not authorized, the packet is discarded. Label converter 74 performs FEC (forward error correction) calculations over the headers tHEC and eHEC and an FCS calculation over the payload and writes the results of these calculations into the packet. Other functions of the label converter 74 include the ability to generate an AIS signal when it detects an abnormal condition in a packet path 200 and the ability to detect an AIS signal and generate an RDI (remote detect indication) signal in response to the detection of the AIS signal. Finally, the label converter 74 performs scrambling on the signal and supplies the scrambled signal to a VC transmit module 73T which is a VC initiation element having the same function as the VC transmit module 64T.

VC transmit module 73T maps the packet data to the payload field of an STM frame and performs virtual concatenation on the mapped data so that the packet traffic is efficiently multiplexed with the STM traffic, and 73T creates a POH field for the STM frame. To perform the virtual concatenation process, the VC transmit module 73T produces a sequence indicator and a multi-frame indication (MFI) signal.

The output of VC transmit module 73T is supplied to an STM path section transmit module 72T. STM path section transmit modulate 72T generates field values of the POH and SOH fields of an STM frame and performs BIBP calculation and insertion of P-RDI and P-REI and assembles an STM frame (including pointer) and provides STM path monitoring by the byte B1 in the section overhead and producing an STM alarm indication signal (S-AIS). Further, the STM path section transmit modulate 72T has a monitor circuit for detecting an S-AIS signal received from other nodes. The output of STM path section transmit module 72T is passed through the interface 71 to the STM switch card 43 (51).

The output signal of the STM path section transmit module 72T is then routed through the STM switch card 45 to an STM line card 45-1 where the signal is converted to an optical signal and transmitted to the transit node 12, which retransmits it to the downstream node 13.

In the opposite direction of transmission, a LAN-initiated remote signal from the downstream node 13 is retransmitted by the transit node 12 and received by the STM line card 45-1, where the optical signal is converted to an electrical signal and routed through the STM switch card 43 to the network-LAN unit 78 of the packet switch card 44. This signal is processed by the network-LAN unit 78 in the same manner as the output of STM path section transmit module 65T is processed by the LAN-network unit 77. The output of the LAN-network unit 77 is then routed through the STM switch card 43 to an STM path section receive module 65R of the LAN line card 42 via the interface 66.

STM path section receive module 65R operates as a termination point of an STM Section as well as a termination point of an STM Path by examining the B1 byte of the Section overhead to monitor the STM path and extracting an MFI signal from the frame. Phase differences between the virtually concatenated channels of the STM frame.

The output of STM path section receive module 65R is applied to a VC receive module 64R. VC receive module 64R is a VC termination element which extracts a layer-2 frame from the STM frame corresponding to an appropriate virtually-concatenated channel and detects a GFP frame mapped in the payload field of the STM frame through a de-mapping process. Further, the VC receive module 64R performs a 1-bit error detection and correction process on the detected GFP frame by calculating the HEC of the core header and discards the layer-2 frame depending on the error calculation. Additionally, it multiplexes packets on a channel-by-channel basis, performs padding and produces an output signal of data format in which packets are multiplexed on individual channels.

The output of the VC receive module 64R is supplied to a GFP receive module or termination element 63R. GFP receive module 63R performs descrambling on the payload of the GFP frame. GFP receive module 63R performs a shaping process for each label and each tag to absorb intra-network delay jitter, monitors the packet path 200, performs 1-bit error detection and correction on the frame header and an FCS error check, and counts the number of error packets in the payload field of the GFP frame. Then, the GFP receive module 63R disassembles the GFP frame to detect a layer-2 frame and sends it to a layer-2 transmit module 62T or layer-2 initiation element.

Layer-2 transmit module 62T performs insertion of a preamble and an SFD field, provides a CRC calculation and an 8B/10B conversion process, and produces a 10-bit wide parallel signal, which is sent to a physical layer transmit module 61T. Additionally, the layer-2 transmit module 62T monitors the packet path 200 by receiving a fault indication from the physical layer transmit module 61T when the latter fails to transmit optical signals to the associated LAN. In response to the fault indication from the physical layer transmit module 61T, the layer-2 transmit module 62T communicates this fault condition to the GFP transmit module 63T via the layer-2 transmit module 62T.

The parallel signal supplied to the physical layer transmit module 61T is converted to a serial signal and converts it to an optical signal and transmits the optical signal to the associated LAN.

In the LAN-associated STM line card 41, a physical layer receive module 81R converts the optical packet data from the associated LAN user to an electrical signal and feeds it to an STM path section transmit module 82T which processes the signal in the same manner as discussed in connection with the STM path section transmit modules 65T and 72T, The output of the STM path section transmit module 82T is passed through an interface 83 to the STM switch card 43 where the signal is routed to an STM line card 45-2 for transmission to the downstream node 12. The remote optical signal from the node 12 is converted to an electrical signal in the STM line card 45-2 and routed through the STM switch card 43 to the interface 83 and passed on to an STM path section receive module 82R, which handles the signal in the same manner as in the STM path section receive module 72R. The output of the module 82R is converted to an optical signal in a physical layer transmit module 81 and transmitted to the associated LAN user.

Figure 3:
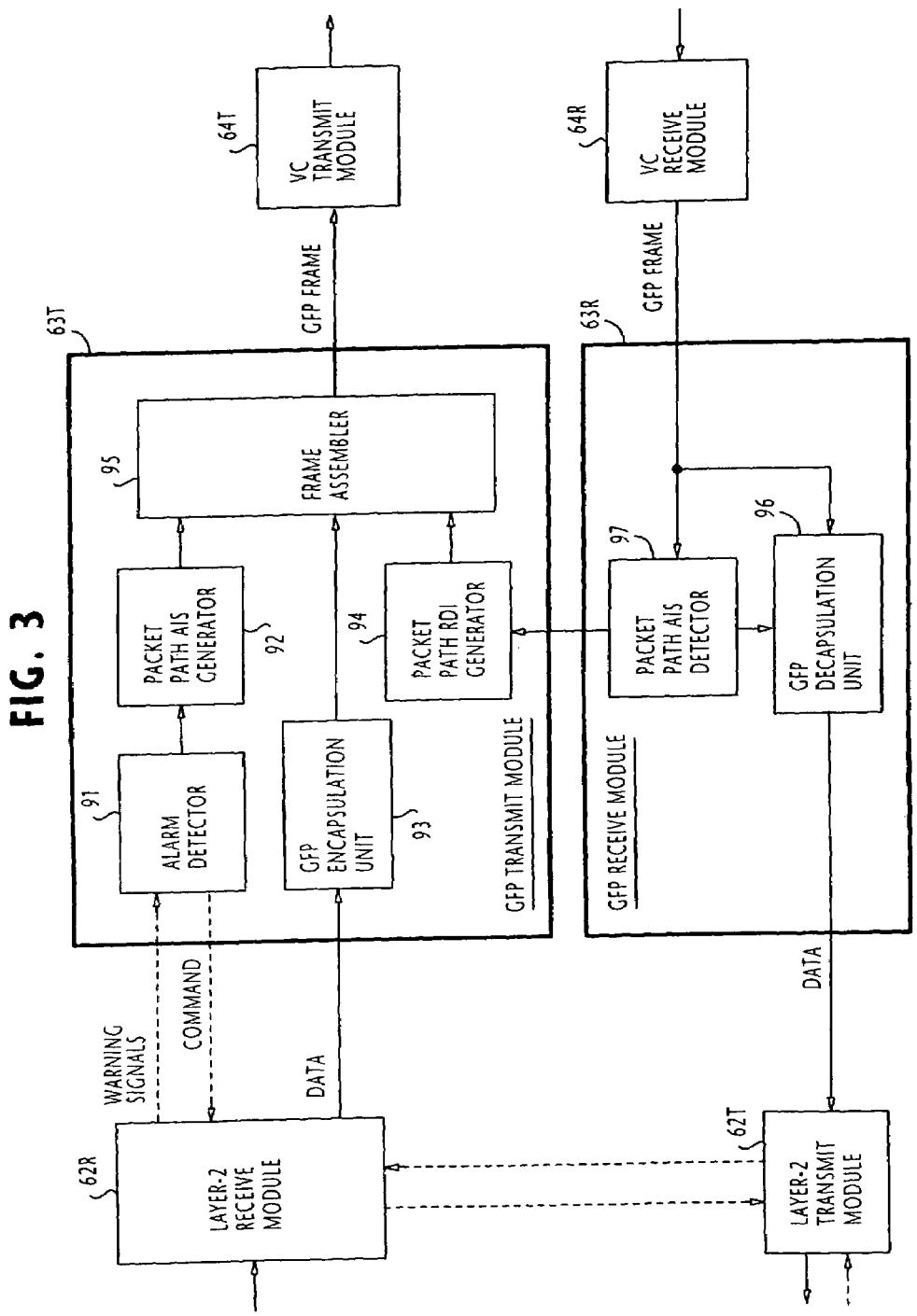
FIG. 3 is a block diagram of a GFP transmit module (initiation element) and a GFP receive module (termination element)

FIG. 3 illustrates details of the GFP transmit module 63T and GFP receive module 63R.

As illustrated, the GFP transmit module 63T includes an alarm detector 91 for extracting an alarm indication from a control message supplied from the layer-2 receive module 62R which indicates a fault condition of the terminating function of physical layer receive module 61R. In response to the detection of an alarm indication, the alarm detector 91 communicates this fact to a packet path AIS generator 92, which in turn produces an AIS signal.

A GFP encapsulation unit 93 is provided for receiving layer-2 packet data from the layer-2 receive module 62R and mapping the received data into the payload field of a GFP frame of the SONET format and scrambling the mapped payload data. Further, the GFP frame assembler 95 performs a core header calculation (PL1, cHEC), makes the determination of the destination of source-port associated label and tag, and a payload header calculation (type, tHEC, label, tag, eHEC), and performs a policing process to determine the remarks of the tag (or discard), produces a frame check sequence. The policing process further determines the priority of LAN packets based on the label. GFP transmit module 63T further includes a packet path RDI generator 94. The outputs of the AIS generator 92, the GFP encapsulation unit 93 and the RDI generator 94 are assembled into a GFP frame by a frame assembler 95 and sent to the VC transmit module 64T.

GFP receive module 63R comprises a GFP decapsulation unit 96 and a packet path AIS detector 97, both being connected from the VC receive module 64R. AIS detector 97 detects an AIS signal from a remote node and informs the packet path RDI generator 94 that an AIS signal has been received from a remote node. In response, the RDI generator 94 produces an RDI (remote defect indication) signal, which is multiplexed by the frame assembler 95 into a GFP frame supplied from the GFP encapsulation unit 93.

GFP decapsulation unit 96 performs descrambling on the payload of a GFP frame received from the VC receive module 64R and 1-bit error detection and correction on the frame header and an FCS error check, and counts the number of error packets in the payload field of the GFP frame. In addition, the GFP decapsulation unit 96 compares the contents of the payload header with a set of predetermined values to identify the destination port number. If it fails to identify the destination port number, the frame is discarded. A valid GFP frame is then disassembled and a layer-2 frame is extracted and sent to the layer-2 transmit module 62T.

The operation of the first embodiment of the present invention will be described with the aid of the block diagram of FIG. 4 and a flowchart shown in FIG. 5.

Figure 4:
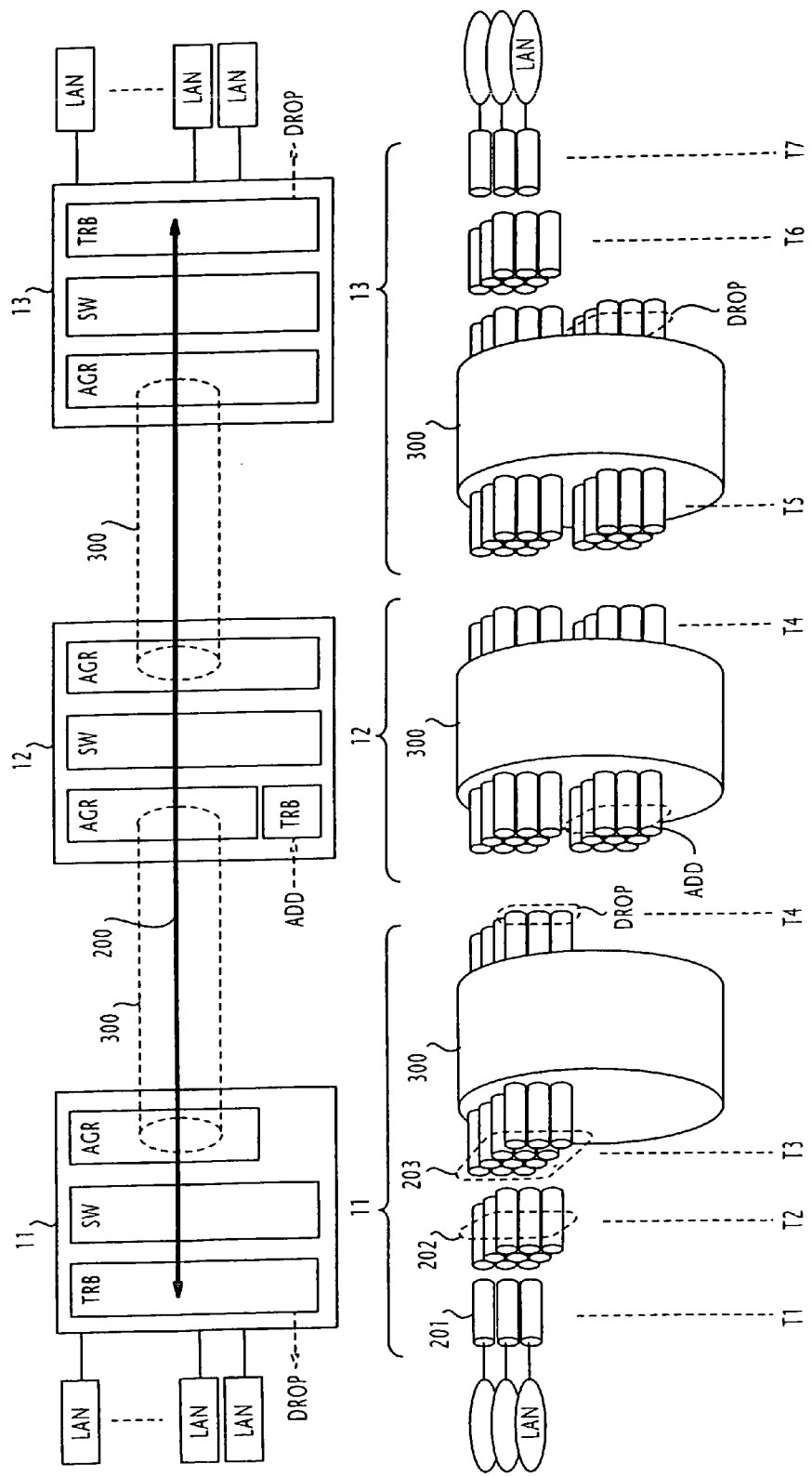
FIG. 4 is a schematic diagram of the ring network useful for describing a path setup process that facilitates provisioning with an add/drop feature of the present invention.
Figure 5:
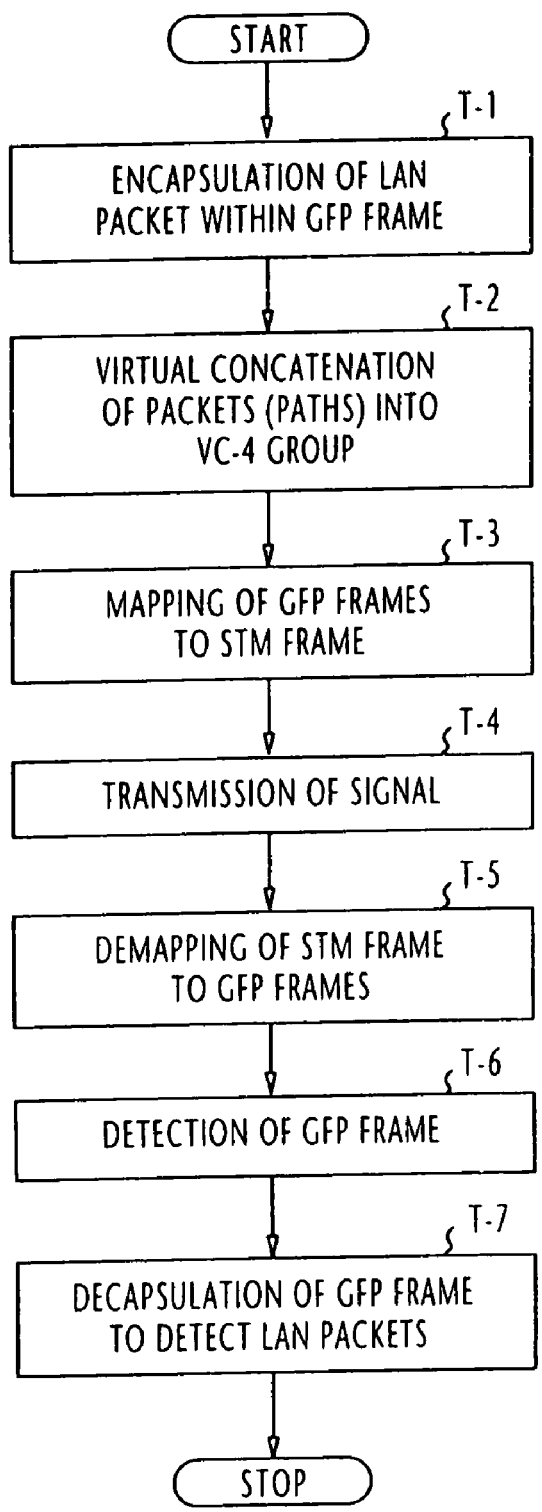
FIG. 5 is a flowchart for illustrating the process of the path setup process in an STM (synchronous transport module) path.

In FIG. 4, a plurality of packet paths 200 are respectively assigned to a plurality of LAN users. These packet paths are accommodated in a single STM path 300. In the network node (ingress node) 11, LAN packets from a LAN user are encapsulated into a GFP frame 201 (step T1, see FIG. 5) and the payloads of a number of GFP frames which can be transported on a single VC-4 are virtually concatenated into a single virtual concatenated group 202 in the VC transmit module 64T (step T2). The GFP frames of the virtual concatenated group are mapped to an STM frame 203 in the STM transmit module 65T (step T3) and transmitted downstream (step T4). This virtual concatenation process allows finer granularity for provisioning of packet/voice communication bandwidth by using the add/drop feature of the present invention. Egress node 13 performs a process inverse to the process just described above. VC receive module 73R (64R) performs demapping of an STM frame (step T5) and the label converter 74 (or GFP receive module 63R) detects GFP frames (step T6). Layer-2 transmit module 61T performs decapsulating of the detected GFP frames to formulate LAN packets for transmission to the destination LAN user (step T7).

Figure 6:
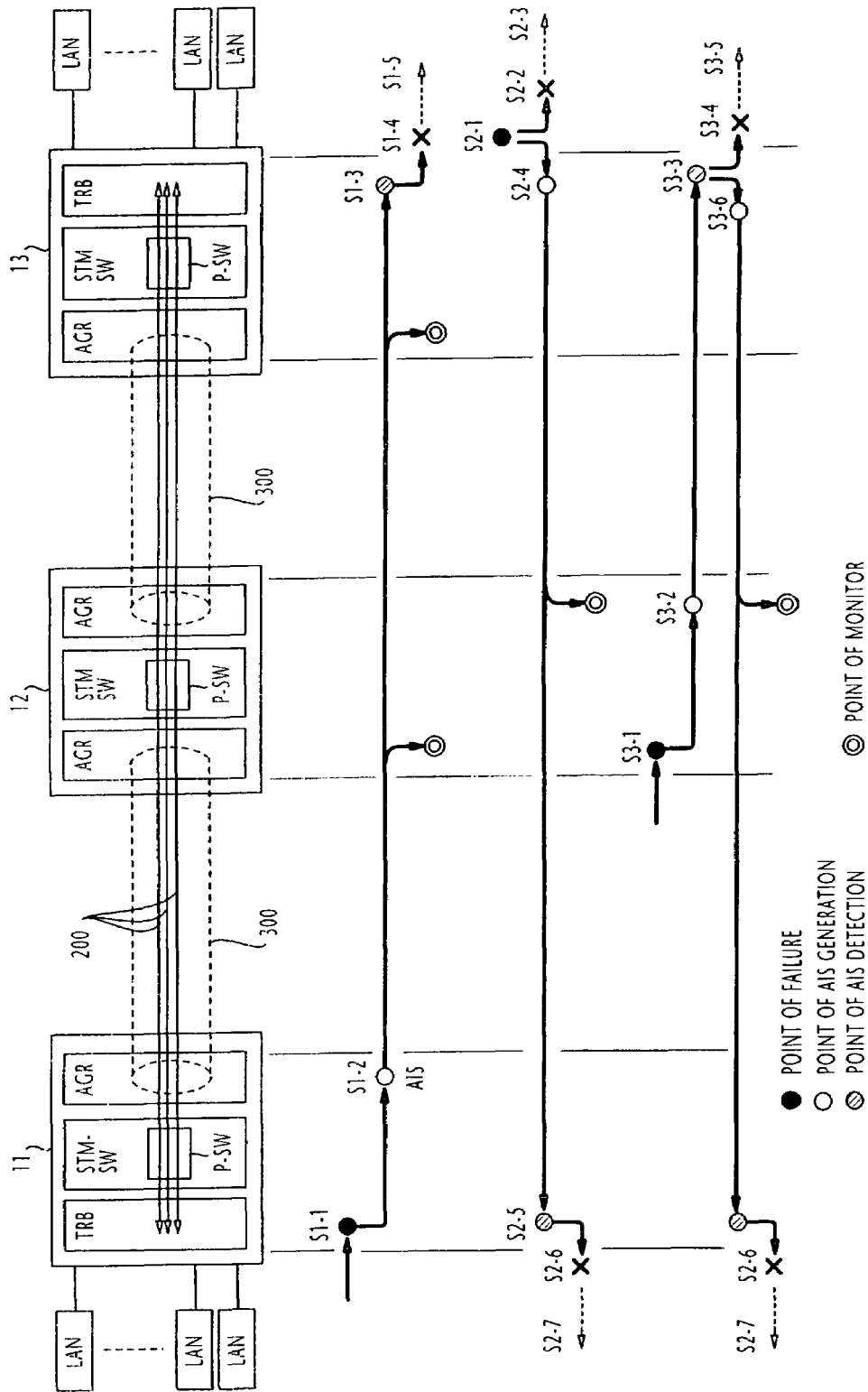
FIG. 6 is a sequence diagram for illustrating the operation of the network when packet path failures occur independently at three different (ingress, egress and transit) points of the network, with a number of packet paths being established from the ingress node to the egress node without passing through a packet switch at the transit node.

FIG. 6 is a sequence diagram of the operation of the nodes 11 to 13 when a failure occurs in a packet path 200 which is established between nodes 11 and 13 through the packet switch 48 at node 12. The operation of the nodes 11 to 13 proceeds according to flowcharts shown in FIGS. 7, 8 and 9.

If a failure occurs at an the ingress point of the network (hence the physical layer receive module 61R of ingress node 11 receives no optical signal from the associated LAN), the network operates as follows:

In the LAN line card 42 of ingress node 11, the layer-2 receive module 62R produces a warning signal (step S1-1, FIG. 7), which is then detected by the alarm detector 91 (FIG. 3). In response to the alarm detector 91 detecting the warning signal, the packet path AIS generator 92 formulates an AIS signal (step S1-2). GFP frame encapsulation unit 93 formulates an OAM (operations, administration, maintenance) GFP frame. The AIS signal is assembled with the OAM-GFP frame, which is then mapped to an STM frame by the VC transmit module 64 and eventually transmitted downstream.

This STM frame is monitored and repeated by the transit node 12 to the egress node 13.

In the packet switch card 52 of the egress node 13, the VC receive module 73R performs demapping of the STM frame to detect the OAM-GFP frame and the label converter 74 extracts the AIS signal from the OAM-GFP frame and formulates and transmits a link disconnect command signal to the LAN line card 54 via the STM switch card 51 (step S1-3).

In the LAN line card 54, the layer-2 transmit module 62T responds to the link disconnect command signal by disconnecting the transmit link of the associated LAN user (step S1-4). Then, the physical layer transmit module 61T terminates the transmission of information signals to the LAN user (step S1-5).

When a failure occurs in the physical layer transmit module 61T of the egress node 13 and no optical signal is sent to the associated LAN user, the node 13 operates as follows.

Figure 8:
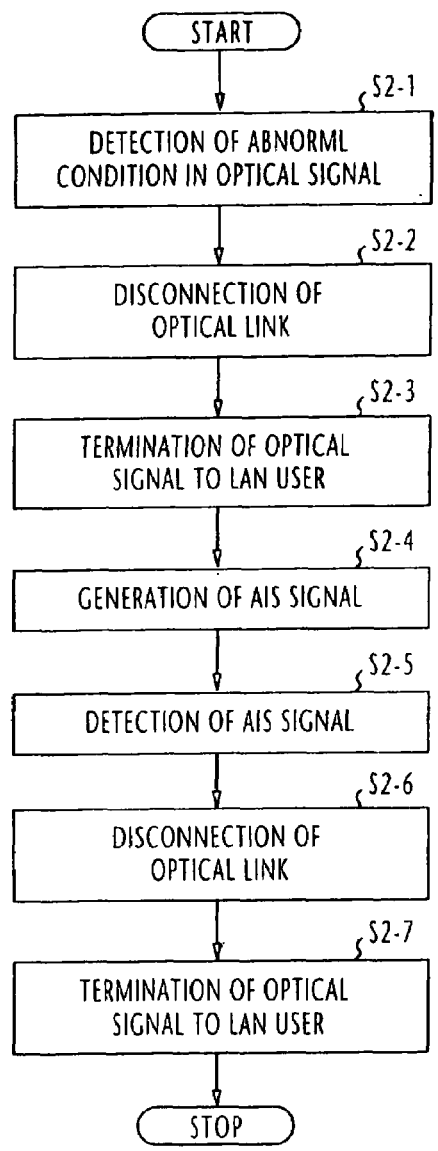
Figure 9:
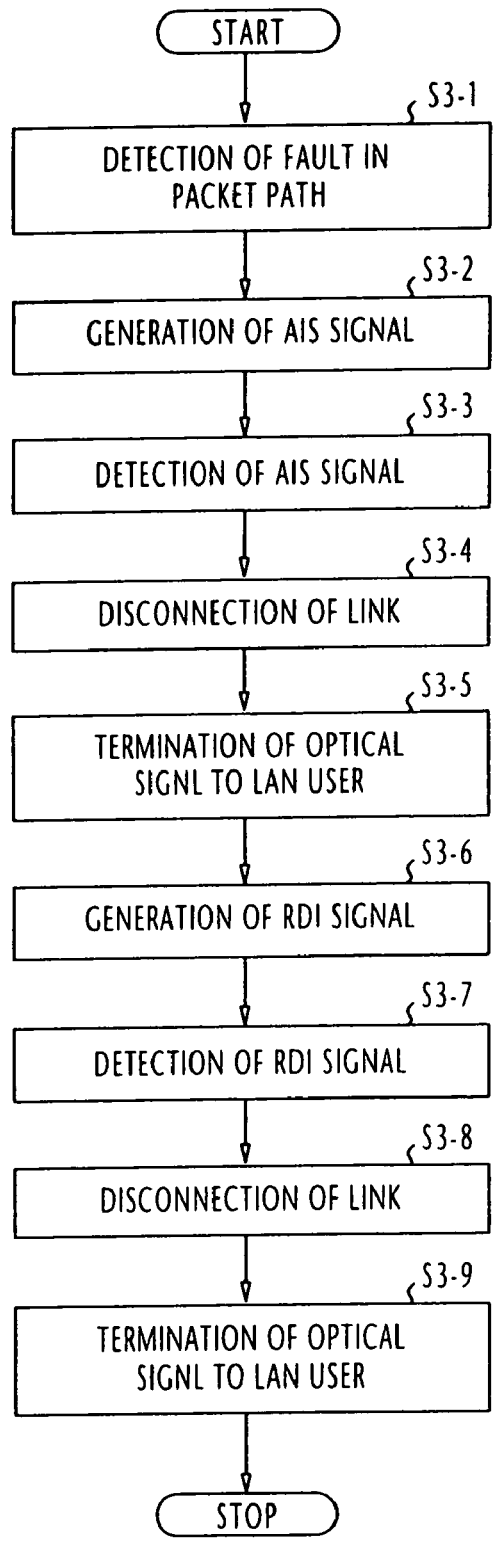

In the LAN line card 54 of node 13, the layer-2 transmit module 62T produces a warning signal and sends it via the layer-2 receive module 62R to the GFP transmit module 63T (step S2-1, FIG. 8). This warning signal is detected by the alarm detector 91 (FIG. 3). Alarm detector 91 sends a link disconnect command signal to the layer-2 transmit module 62T via the layer-2 receive module 62R. Layer-2 transmit module 62T disconnect the transmit link (step S2-2) and the physical layer transmit module 61T terminates the transmission of information signals to the LAN user (step S2-3). When the alarm detector 91 detects this warning signal, the packet path AIS generator 92 formulates an AIS signal, which is inserted by the frame assembler 95 into an OAM-GFP frame produced by GFP frame encapsulation unit 93. The OAM-GFP frame is then mapped to an STM frame by the VC transmit module 64T and transmitted upstream (step S2-4).

This STM frame is monitored and repeated by the transit node 12 to the ingress node 11.

In the packet switch card 44 of node 11, the VC receive module 73R performs demapping of the STM frame to detect the OAM-GFP frame and the label converter 74 extracts the AIS signal from the OAM-GFP frame and formulates and transmits a link disconnect command signal to the STM switch card 43 (step S2-5). In response to the link disconnect command signal, the layer-2 transmit module 62T of LAN line card 42 disconnects the transmit link of the associated LAN user (step S2-6) and the physical layer transmit module 61T terminates the transmission of information signals to the LAN user (step S2-7).

When a failure occurs at an intermediate point of the packet path 200 between nodes 11 and 12, the transit node 12 operates as follows:

In the packet switch card 48, the label converter 74 detects this abnormal condition (step S3-1, FIG. 9) and formulates an AIS signal and assembles it with an OAM-GFP frame and delivers this frame to the VC transmit module 73T. The OAM-GFP frame is mapped to an STM frame in the STM path section transmit module 72T and transmitted from the node 12 to the egress node 13 (step S3-2).

In the LAN line card 54 of egress node 13, the VC receive module 64R detects a GFP frame from the received OAM-STM frame and the AIS detector 97 of the GFP receive module 63R detects the AIS signal from the GFP frame and formulates and transmits a link disconnect command signal to the layer-2 transmit module 62T via the GFP decapsulation unit 96 (step S3-3). In response to the link disconnect command signal, the layer-2 transmit module 62T disconnects the transmit link of the associated LAN user (step S3-4) and the physical layer transmit module 61T terminates the transmission of information signals to the LAN user (step S3-5). At the same time, the RDI generator 94 responds to the AIS detector 97 detecting the AIS signal by formulating an RDI (remote defect indication) signal. The RDI signal is assembled by the frame assembler 95 with an OAM-GFP frame produced by the GFP encapsulation unit 93. The OAM-GFP frame is then mapped to an STM frame in the VC transmit module 64T and transmitted (step S3-6).

This STM frame is monitored and repeated by the transit node 12 to the ingress node 11.

In the LAN line card 42 of the ingress node 11, the VC receive module 64R detects the OAM-GFP frame from the transmitted STM frame and delivers the OAM-GFP frame to the GFP receive module 63R in which the AIS detector 97 detects the RDI signal contained in the OAM-GFP frame and formulates a link disconnect command signal and transmits it through the GFP decapsulation unit 96 to the layer-2 transmit module 62T (step S3-7). In response to the link disconnect command signal, the layer-2 transmit module 62T disconnects the transmit link of the associated LAN user (step S3-8) and the physical layer transmit module 61T terminates the transmission of optical information signals to the LAN user (step S3-9).

It is seen from the foregoing discussion, when a failure occurs in a packet path, the transport network of the present invention enables transport providers to clearly identify a trouble shooting point that divides the path into a faulty and a normal cable section. Due to the network's ability to clearly identify the trouble shooting point, the present invention eliminates limitations which would otherwise be imposed on the OAM (operations, maintenance and administration) aspect of the transport network. Thus, large scale backbone networks could be built and maintained by a number of transport providers.

If a failure occurs in an STM path, an AIS signal will be generated to give warning to the network operator. However, if the failed STM accommodates a packet path, an AIS signal is also generated for informing the network operator of the failure of the packet path. Since the warning generated in response to the STM path failure is an alarm signal of primary importance and the warning generated in response to the packet path failure is an alarm signal of secondary importance. It is desirable that the secondary alarm signal should be discarded in favor of the primary alarm signal.

Figure 10:
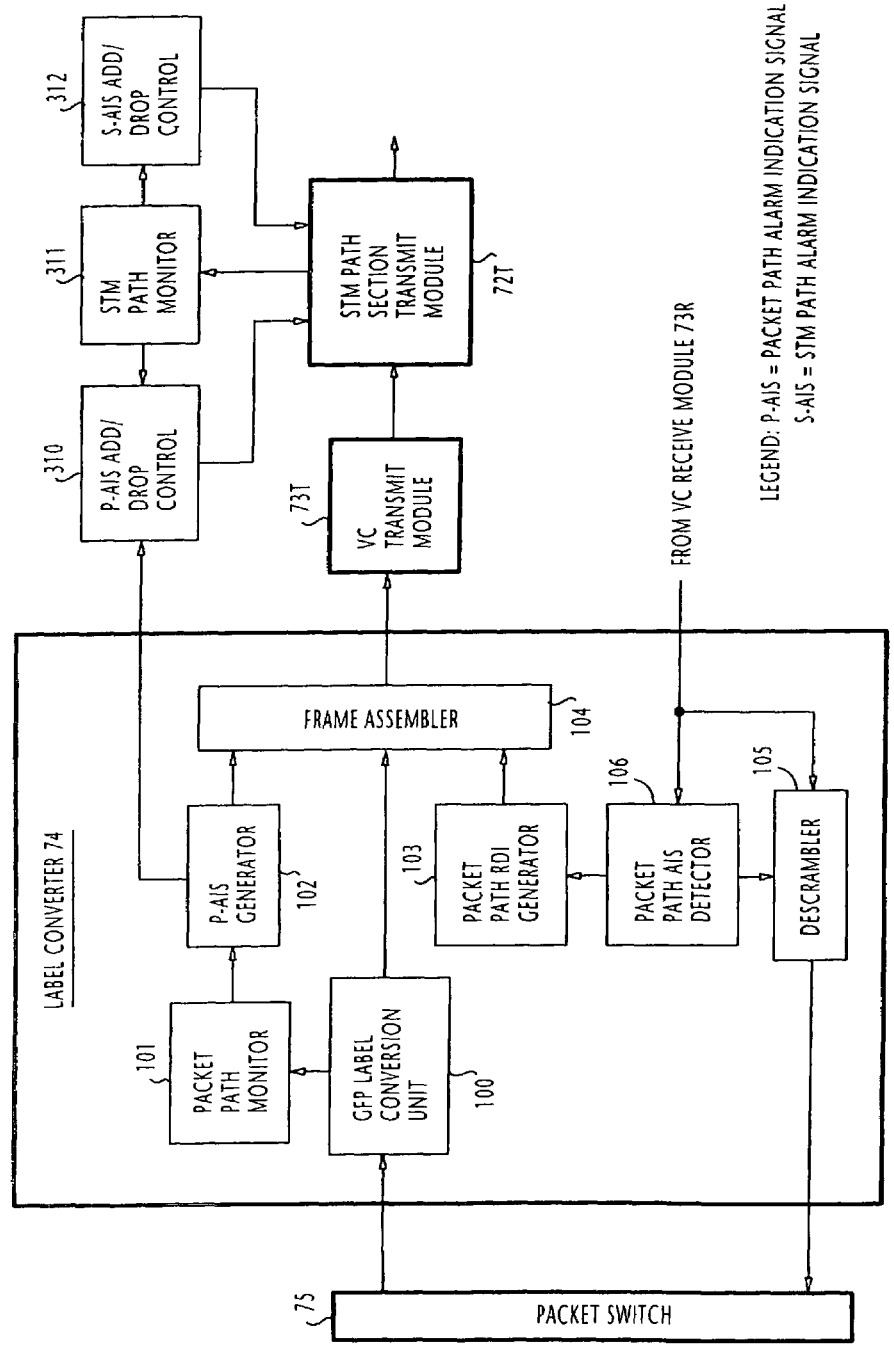
FIG. 10 is a block diagram showing details of a label converter and AIS add/drop control circuitry according to a modified embodiment of the present invention.

A modified embodiment of the present invention is shown in FIG. 10 in which details of the level converter 74 of the packet switch card 44 (48, 52) and AIS add/drop control circuitry are illustrated to implement the priority scheme for dropping secondary-level alarm signals in the event of a failure in an STM path that triggers a primary-level alarm signal.

In FIG. 10, the label converter 74 includes a GFP label conversion UNIT 100 connected to receive packet data from the packet switch 75 and a packet path monitor 101. GFP label conversion unit 100 performs scrambling on the payload field of each packet, add parity bits to the data and forwards the packet to a frame assembler 104. Additionally, during initial registration or during label alterations, the GFP label conversion unit 100 writes labels into a conversion memory and makes reference to the conversion memory for coincidence between a stored label and a label contained in the received packet. If no coincidence occurs, the packet is discarded as invalid data. Further, it performs error calculations on tHEC/eHEC and an FCS calculation on the payload and writes the results of these calculations into the packet and forwards the packet to a frame assemblser 104. Further, the headers tHEC/eHEC of the packet data are monitored and if an uncorrectable error is detected, the packet is discarded. FCS check is performed on a per L2-lebel basis to monitor the packet path 200. If an abnormal condition is detected on the path 200, the packet path monitor 101 activate a packet path AIS generator 102, which produces a packet path AIS (P-AIS) signal. Label converter 74 further includes a packet path RDI generator 103, a descrambler 105 and a packet path AIS detector 106, both of which are connected from the VC receive module 73R. When the packet path AIS (P-AIS) detector 106 detects an AIS signal, it activates the packet path RDI generator 103 to produce an RDI signal, which is assembled in a GFP frame produced by the GFP label conversion unit 100. The GFP frame is forwarded to the VC transmit module 73T. On the other hand, the payload field of each GFP frame from the VC receive module 73R is descrambled by the descrambler 105 and supplied to the packet switch 75 as described in the previous embodiment.

The AIS add/drop control circuitry includes a P-AIS add/drop control unit 310, an STM path monitor 311 and an STM-path AIS (hereinafter S-AIS) add/drop control unit 312. These units are associated with the STM path section transmit module 72T.

P-AIS add/drop control unit 310 is connected to the P-AIS generator 102. When the packet path fails, the P-AIS add/drop control unit 310 receives a P-AIS presence signal from the P-AIS generator 102, indicating that a P-AIS signal is detected. STM path monitor 311 is constantly monitoring the STM path. If the STM should fail, the STM path monitor 311 instructs the S-AIS add/drop control unit 312 to formulate an S-AIS signal. The latter is applied to the STM path section transmit module 72 where the S-AIS signal is assembled in an STM frame and transmitted. At the same time, the P-AIS add/drop control unit 310 is informed of this fact. If the P-AIS add/drop control unit 310 has already received a P-AIS presence signal from the P-AIS generator 102, it commands the STM path section transmit module 72T to remove the P-AIS signal from every STM frame until it receives a P-AIS add command signal from the P-AIS add/drop control unit 310 when the STM path has been restored.

Figure 11:
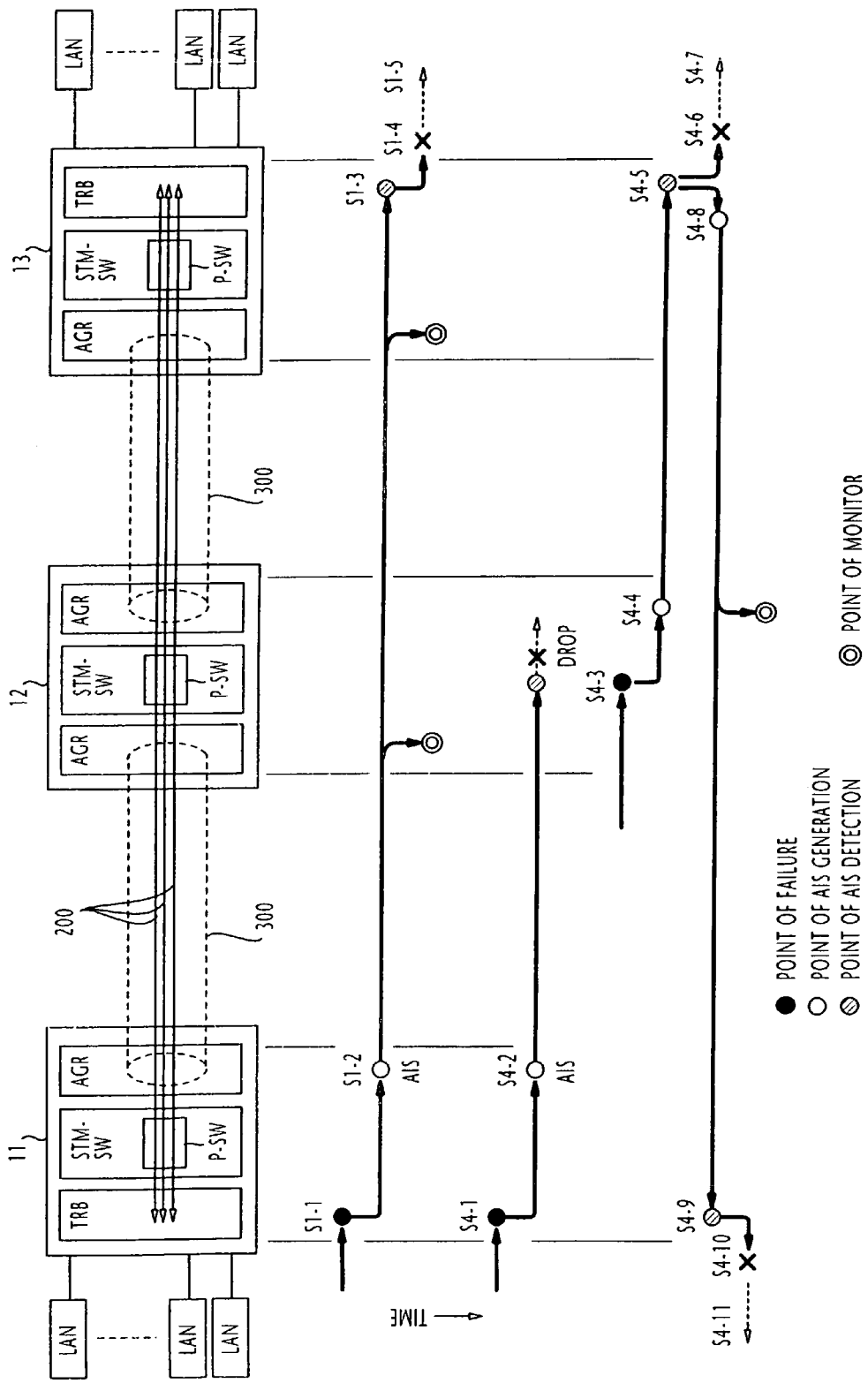
FIG. 11 is a sequence diagram for illustrating the operation of the network when a packet path failure and an STM path failure occur in succession at ingress and transit points of the network, with a number of packet paths being established from the ingress node to the egress node through a packet switch at the transit node.
Figure 12:
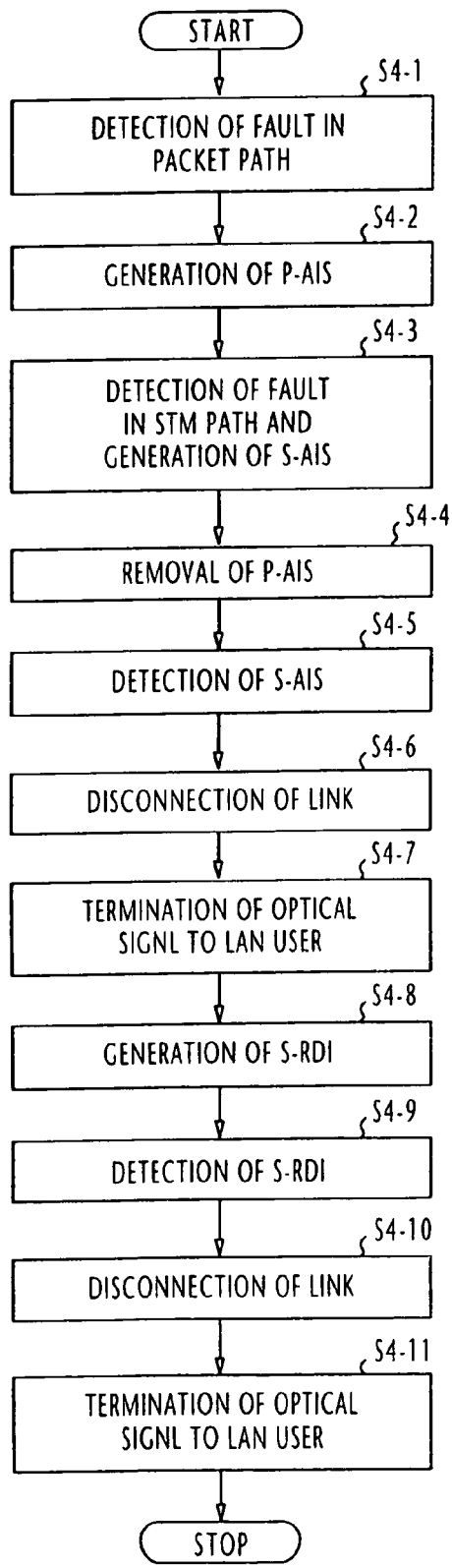
FIG. 12 is a flowchart of the operation of the network when failures occur at the successive points of FIG. 10.

The operation of the prioritized alarming scheme of the present invention will be described below with reference to FIGS. 11 and 12. Note that the intermediate section of the packet path 200 is established jointly by the STM and packet switches at the transit node 12 (FIG. 11)

Assume that a failure has occurred initially in the packet path 200 between a LAN user and the ingress node 11 and subsequently the STM path 300 fails at a point between nodes 11 and 12.

Figure 7:
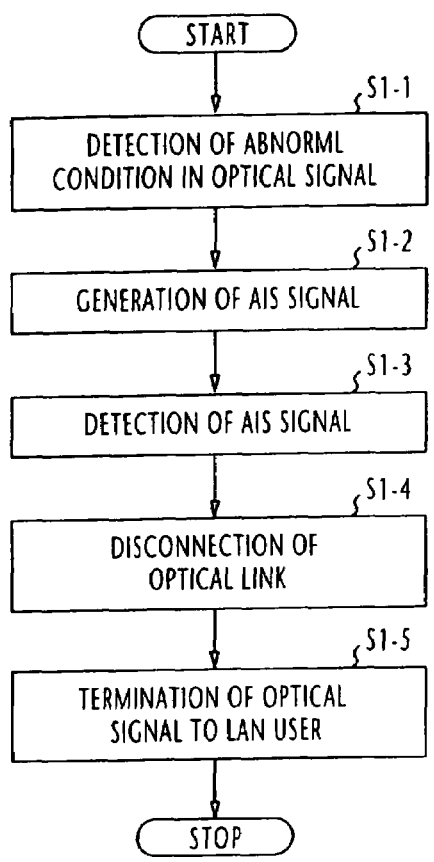
FIGS. 7, 8 and 9 are flowcharts of the operation of the network nodes corresponding to the occurrences of failure in the three different points.

In response to the initial failure in the packet path 200, the nodes 11, 12 and 13 operate in the same manner as described in connection with the flowchart of FIG. 7. As a result, step S1-1 through S-5 of FIG. 7 are successively executed as indicated in FIG. 11.

If the STM path 300 between nodes 11 and 12 fails following the transmission of at least one P-AIS signal from the ingress node 11, steps 4-1 and 4-2 have been executed by the ingress node 11 corresponding to steps S1-1 and S1-2 and a further P-AIS signal is transmitted from the node 11.

In the transit node 12, the STM path section transmit module 72T of packet switch detects this failure from an OAM-STM frame and produces an S-AIS signal (step S4-3). In response, the P-AIS add/drop control unit 310, which has already received a P-AIS presence signal from the P-AIS generator 102, produces a P-AIS drop command signal. STM path section transmit module 74T responds to this command signal by removing a P-AIS signal from the OAM-STM frame (step S4-4).

In the LAN line card 54 of egress node 13, the VC receive module 64R detects a GFP frame from the received OAM-STM frame and the AIS detector 97 of the GFP receive module 63R detects the S-AIS signal from the GFP frame (step 54-5) and formulates and transmits a link disconnect command signal to the layer-2 transmit module 62T via the GFP decapsulation unit 96.

In response to the link disconnect command signal, the layer-2 transmit module 62T disconnects the transmit link of the associated LAN user (step S4-6) and the physical layer transmit module 61T terminates the transmission of information signals to the LAN user (step S4-7). At the same time, the RDI generator 94 responds to the AIS detector 97 detecting the AIS signal by formulating an RDI (remote defect indication) signal. The RDI signal is assembled by the frame assembler 95 with an OAM-GFP frame produced by the GFP encapsulation unit 93. The OAM-GFP frame is then mapped to an STM frame in the VC transmit module 64T and transmitted (step S4-8).

This STM frame is monitored and repeated by the transit node 12 to the ingress node 11.

In the LAN line card 42 of the ingress node 11, the VC receive module 64R detects the OAM-GFP frame from the transmitted STM frame and delivers the OAM-GFP frame to the GFP receive module 63R in which the AIS detector 97 detects the RDI signal contained in the OAM-GFP frame and formulates a link disconnect command signal and transmits it through the GFP decapsulation unit 96 to the layer-2 transmit module 62T (step S4-9). In response to the link disconnect command signal, the layer-2 transmit module 62T disconnects the transmit link of the associated LAN user (step S4-10) and the physical layer transmit module 61T terminates the transmission of optical information signals to the LAN user (step S4-11).

What is claimed is:

1. A transport network, comprising:
    a plurality of network nodes, each of the nodes receiving STM (synchronous transport module) frames and LAN (local area network) packets, wherein each of said network nodes establishes an STM path on a communication link for transporting said STM frames and establishes a plurality of packet paths within the STM path for transporting said LAN packets, and wherein each of said network nodes monitors said packets, produces a warning signal if an abnormal condition is detected in one of said packet paths and transmits the warning signal to said communication link;
    a unit for monitoring said STM frames, producing a warning signal if an abnormal condition of said STM path is detected and transmitting the warning signal to said communication link; and
    a unit for receiving the warning signal of the STM path and preventing the warning signal of said one packet path from being transmitted to said communication link.

2. A transport network, comprising:
    a plurality of network nodes, each of the nodes receiving STM (synchronous transport module) frames and LAN (local area network) packets, wherein:
    each of said network nodes establishes an STM path on a communication link for transporting said STM frames and establishes a plurality of packet paths within the STM path for transporting said LAN packets,
    each of said network nodes monitors said packets, produces a warning signal if an abnormal condition is detected in one of said packet paths and transmits the warning signal to said communication link, and
    each of said network nodes includes a unit for receiving said warning signal and transmitting a response signal over the packet path in a direction opposite to the direction of transmission of said warning signal when said abnormal condition is detected at an intermediate point of said one packet path.

3. A transport network,
a plurality of network nodes, each of the nodes receiving STM (synchronous transport module) frames and LAN (local area network) packets, wherein:
each of said network nodes establishes an STM path on a communication link for transporting said STM frames and establishes a plurality of packet paths within the STM path for transporting said LAN packets,
each of said network nodes monitors said packets, produces a warning signal if an abnormal condition is detected in one of said packet paths and transmits the warning signal to said communication link, and
said warning signal is produced when said abnormal condition is detected at an end point of said one packet path.

4. A network node comprising:
a tributary line interface for receiving LAN (local area network) packets;
a packet switch for performing a switching operation on said LAN packets;
an aggregate line interface for establishing an STM (synchronous transport module) path on a communication link and establishing a plurality of packet paths within the STM path;
an STM switch for connecting said packet switch between said tributary line interface and said aggregate line interface so that the switched packets are transported over said plurality of packet paths; and
monitoring circuitry for monitoring said packets, producing a warning signal if an abnormal condition is detected in one of said packet paths and transmitting the warning signal to said communication link.

5. The network node of claim 4, wherein said monitoring circuitry is provided in said tributary line interface.

6. The network node of claim 5, wherein the monitoring circuitry of said tributary line interface produces said warning signal when said abnormal condition is detected at an end point of said one packet path.

7. The network node of claim 4, wherein said monitoring circuitry is provided in said packet switch.

8. The network node of claim 7, wherein said packet switch includes response circuitry for receiving the warning signal and transmitting a response signal to said communication link in a direction opposite to the direction of transmission of the warning path.

9. The network node of claim 4, wherein said packet switch includes:
a unit for monitoring said STM frames, producing a warning signal if an abnormal condition is detected in said STM path and transmitting the warning signal to said communication link; and
a unit for receiving the warning signal of the STM path and preventing the warning signal of said one packet path from being transmitted.

10. The network node of claim 9, wherein said tributary line interface includes:
a GFP (generic framing procedure) transmit module for assembling said LAN packets into a GFP frame;
a VC (virtual concatenation) transmit module for mapping the GFP frame to said STM frame;
a VC receive module for demapping a received STM frame to a GFP frame; and
a GFP receive module for disassembling the GFP frame into LAN packets,
wherein said monitoring circuitry is provided in said GFP transmit module and said response circuitry is provided in said GFP receive module.

11. The network node of claim 10, wherein said packet switch includes:
a second VC receive module for receiving the STM frame from the tributary line interface and demapping the received STM frame to a GFP frame;
packet switching circuitry for receiving the GFP frame and producing a packet-switched GFP frame; and
a second VC transmit module for receiving the packet-switched GFP frame and mapping the received GFP frame to an STM frame and transmitting the STM frame to the aggregate line interface.

12. The network node of claim 11, wherein said monitoring circuitry and said response circuitry are provided between the second VC receive module and the second VC transmit module.

13. A method of providing a warning signal over a communication link to a network node, said method comprising:
receiving LAN (local area network) packets;
performing a switching operation on said LAN packets;
establishing an STM (synchronous transport module) path on a communication link;
establishing a plurality of packet paths within the STM path;
transporting the switched packets over said plurality of packet paths;
monitoring said packets;
producing a warning signal if an abnormal condition is detected in one of said packet paths.

* * * * *